L. W. DRAKE.
Coffin and Casket.
No. 197,968. Patented Dec. 11, 1877.
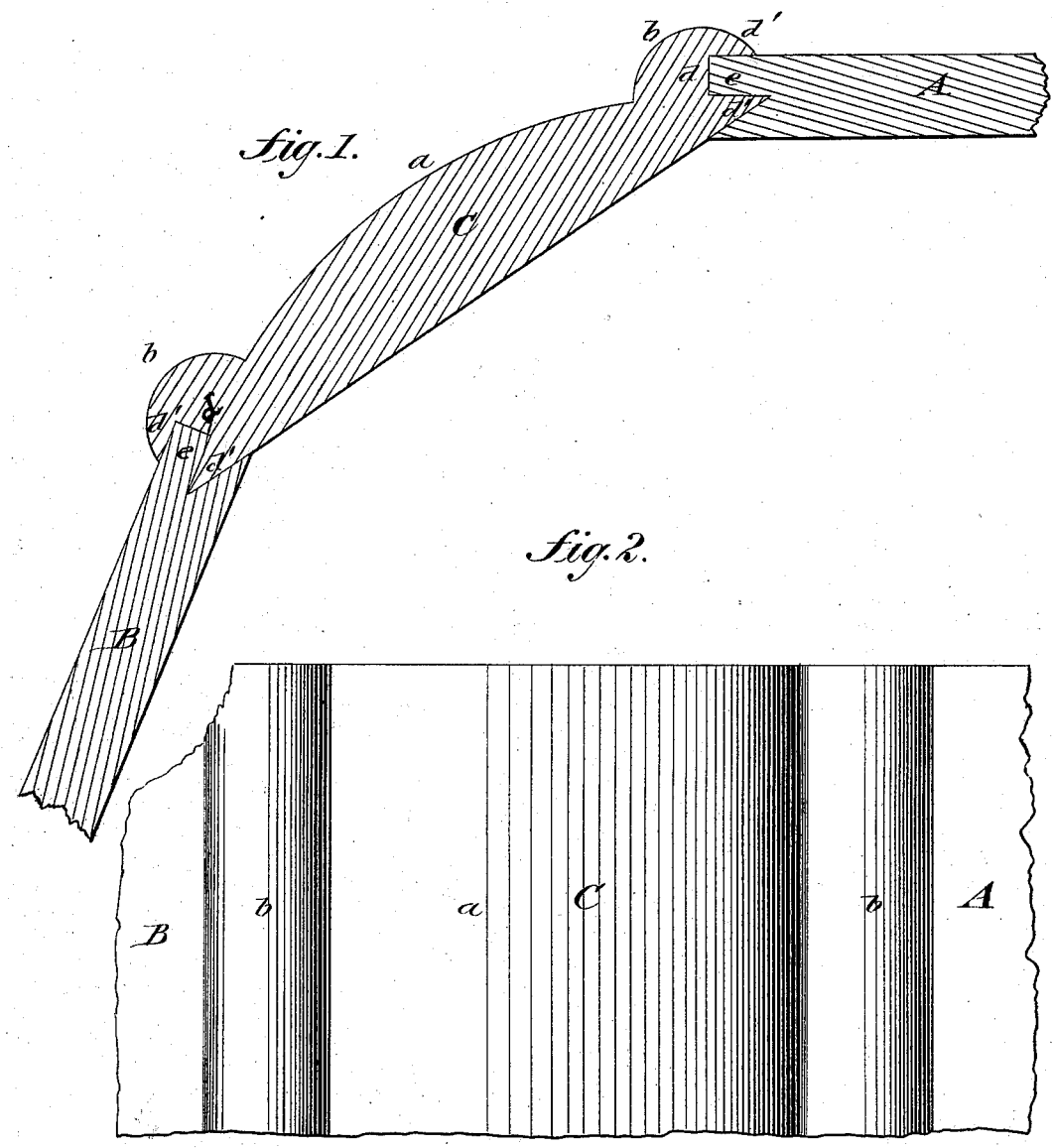

UNITED STATES PATENT OFFICE.

LEWIS W. DRAKE, OF HAZLETON, PENNSYLVANIA.

IMPROVEMENT IN COFFINS AND CASKETS.

Specification forming part of Letters Patent No. 197,968, dated December 11, 1877; application filed October 12, 1877.

*To all whom it may concern:*

Be it known that I, LEWIS W. DRAKE, of Hazleton, in the county of Luzerne and State of Pennsylvania, have invented a new and Improved Coffin and Casket, of which the following is a specification:

In the accompanying drawings, Figure 1 represents a detail horizontal section of a coffin or casket with my improved corner-piece, and Fig. 2 a side elevation of the same.

Similar letters of reference indicate corresponding parts.

The object of this invention is to provide a new construction of corner-pieces for coffins or caskets, by which a more ornamental form and finish may be given to them, and a stronger and superior joint of the corners with the ends and sides be obtained.

The invention consists of a coffin or casket whose ends and sides are connected by intermediate corner-pieces, placed at obtuse angles thereto, which corner-pieces are made with semicircular side beads, and the joints with the ends and sides obtained by interlocking tongues and grooves of a peculiar form, as will be more fully described hereinafter.

Referring to the drawings, A represents the end, and B one of the sides, of a coffin or casket. These ends and sides are connected by a corner-piece, C, which is jointed to the ends and sides at the usual angle, and made at the outside with a curved middle portion, $a$, and with semicircular side beads $b$. The corner-piece C is made of inch lumber, whether intended for a large or small coffin, and retains, when the outer shape is given, even at the weakest points, the same thickness as the ends and sides, which are usually made of one-half or five-eighth boards. The joint of the corner-piece with the ends and sides is made by double interlocking tongues and grooves of the parts, which are formed by cutting first rectangular grooves $d$, so as to form angular tongues $d$ $d'$, the inner ones of which enter corresponding grooves in the side and end pieces A B.

The grooves are cut into the ends of the end pieces or sides of the coffin from the inner edges of the same, in line with the inner face of the corner-piece, the other sides of the grooves being made parallel to the outer face of the ends or sides, so as to form tongues $e$, that fit accurately into the grooves $d$ of the corner-piece. The interlocking of the tapering tongues of the corner-piece, and the tapering and rectangular tongues of the sides, form strong joints of the parts, that are finished at the outside by the overlapping beads.

This peculiar joint has the advantage of facilitating the nailing and gluing together of the parts, which nailing and gluing are done in quick and effective manner, by setting a block against the bead and driving the corners together.

The projecting beads of the corner-piece also receive the base-molding running around the bottom edge and top bead of coffins and caskets.

The corner-piece admits the finishing of the box part of the coffin in superior manner, to which box part the bottom is then attached, while in the present mode of constructing coffins the ends and sides have to be nailed to the bottom first, and the corners then driven in afterward, which does not allow as nice finish, and requires the use of iron staples or stays, which are wholly dispensed with in my construction.

As the corner-pieces may be made of inch stuff, they produce a saving in material, while the double interlocking joints are strong and reliable.

When the coffin is finished by sandpapering, varnishing, and rubbing, the corners present a superior ornamental appearance by the beads, which obviate also the necessity of continuing the base around the corners, as it may be terminated at the beads. The beads allow also of any ornamental trimmings, such as studs, stars, &c., and improve the shape of the coffin or casket jointly with strengthening the same.

By the relative arrangement of the bead $b$ and the rectangular joint, the tie-nail may be made to pass through the bead, and into the middle of, as well as in line with, the tenon, thus securing a very firm and reliable hold.

What I claim is—

The corner-piece C, having external end beads $b$ $b$ and rectangular end grooves $d$ $d$, the latter being between angular tongues $d'$ $d'$, as shown and described, for the purpose specified.

LEWIS WESLEY DRAKE.

Witnesses:
 CHAS. F. HILL,
 C. BACHMAN.